(12) United States Patent
Yonemoto et al.

(10) Patent No.: US 6,339,215 B1
(45) Date of Patent: Jan. 15, 2002

(54) SOLID STATE IMAGE SENSING DEVICE AND IMAGE SIGNAL PROCESSING METHOD OF THE SAME

(75) Inventors: Kazuya Yonemoto, Tokyo; Takahisa Ueno, Kanagawa; Ryoji Suzuki, Kanagawa; Koichi Shiono, Kanagawa, all of (JP)

(73) Assignee: Sony Corporation (JP)

(*) Notice: Subject to any disclaimer, the term of this patent is extended or adjusted under 35 U.S.C. 154(b) by 0 days.

(21) Appl. No.: 09/546,168

(22) Filed: Apr. 11, 2000

(30) Foreign Application Priority Data

Apr. 15, 1999 (JP) .......................................... 11-107476

(51) Int. Cl.[7] .............................................. H01L 27/00
(52) U.S. Cl. ..................................... 250/208.1; 348/308
(58) Field of Search ........................ 250/208.1, 214 A; 348/308, 309, 295, 297; 257/291

(56) References Cited

U.S. PATENT DOCUMENTS 5,168,153 A * 12/1992 Ikeda ..................... 250/214 A
6,118,842 A * 9/2000 Arai et al. ................. 378/39

* cited by examiner

Primary Examiner—David V. Bruce
Assistant Examiner—Courtney Thomas
(74) Attorney, Agent, or Firm—Ronald P. Kananen; Rader, Fishman & Grauer PLLC (57) ABSTRACT

A bias voltage must be reduced to about a half of the power source voltage in order to reserve sufficient output voltage range of a current/voltage converting circuit but, as a result, about a half voltage of the power source voltage is applied to the amplification transistor of pixel and thereby amplification factor of the pixel is lowered and linearity is deteriorated. Therefore, each potential of the signal lines is lowered and a larger voltage is applied to the amplification transistor of pixel by providing a current Miller circuit between the horizontal signal line and current/voltage converting circuit and by controlling independently each potential of the vertical signal line and horizontal signal line and the input voltage of the current/voltage converting circuit in the CMOS type image sensing device of the current output system in which the pixel signal is output to the vertical signal line as the signal current from each pixel.

7 Claims, 7 Drawing Sheets

SOLID STATE IMAGE SENSING DEVICE AND IMAGE SIGNAL PROCESSING METHOD OF THE SAME

BACKGROUND OF THE INVENTION

1. Field of the Invention

The present invention relates to an X-Y address type solid state image sensing device represented by a CMOS type image sensing device and an amplification type image sensing device and an image signal processing method of the same, and particularly to a current output type solid state image sensing device and a processing method for processing an image signal of the same.

2. Description of Related Art

Figure 8:
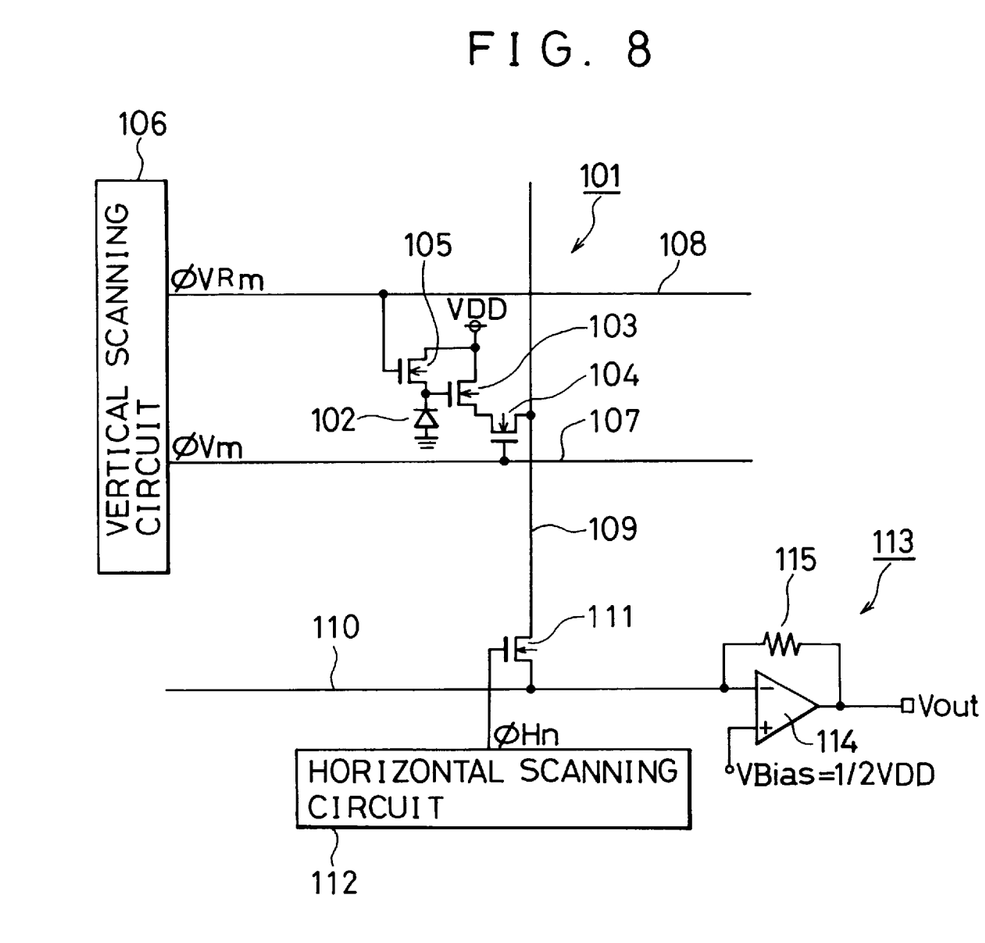
FIG. 8 illustrates a structure of the related art of the CMOS type amplifying device.

A structure of a related art of a solid state image sensing device, for example, a CMOS type image sensing device which outputs an image signal as a current is illustrated in FIG. 8.

In FIG. 8, a unit pixel 101 is formed of a photo-diode 102, a transistor 103 for amplification, a transistor 104 for vertical selection and a transistor 105 for reset. This unit pixel 101 is arranged in the X direction (column direction) and Y direction (row direction). Here, in order to simplify the figure, only the pixels of m-row and n-column are illustrated.

In this unit pixel 101, a vertical scanning pulse φ Vm is impressed to the gate electrode of the transistor 104 for vertical selection via a vertical selection line 107 from a vertical scanning circuit 106 and a vertical reset pulse φ $V^R$m is impressed to the gate electrode of the transistor 105 for reset via a vertical reset line 108 from the vertical scanning circuit 106. Moreover, signal charge photo-electrically converted by a photo-diode 102 is then converted to a signal current by the transistor 103 for amplification and is then output to a vertical signal line 109 via the transistor 104 for vertical selection.

Between the vertical signal line 109 and horizontal signal line 110, a transistor 111 for horizontal selection is connected. To the gate electrode of the transistor 111 for horizontal selection, a horizontal scanning pulse φ Hn is impressed to a horizontal scanning circuit 112. Thereby, a signal current output to the vertical signal line 109 from the pixel 101 flows into the horizontal signal line 110 through the transistor 111 for horizontal selection.

At the end part of the horizontal signal line 110, a current/voltage converting circuit 113 is provided. This current/voltage converting circuit 113 is composed of a differential amplifier 114 connected at its inverted (−) input terminal to the horizontal signal line 110 and a feedback resistor 115 connected between the inverted input terminal and an output terminal of the differential amplifier 114. Moreover, to the non-inverted (+) input terminal of the differential amplifier 114, a bias voltage Vbias is applied and a signal current input through the horizontal signal line 110 is converted to a signal voltage and is then output.

In a MOS type image sensing device of the related art of the structure explained above, when the on-chip structure is realized by fabricating a current/voltage converting circuit 113 on the same semiconductor substrate as pixel portion, a power source voltage VDD of the current/voltage converting circuit 113 usually becomes single power source voltage such as 5 V or 3 V. Therefore, when the circuit configuration formed of the differential amplifier 114 and feedback resistor 115 as explained above is used as the current/voltage converting circuit 113, this circuit assures sufficient output voltage range only by setting the bias voltage Vbias to almost a half of the power source voltage VDD.

As explained above, when the bias voltage Vbias of the current/voltage converting circuit 113 is set to about a half of the power source voltage VDD, each potential of the vertical signal line 109 and horizontal signal line 110 to which a signal current is output from the pixel 101 becomes almost equal to the bias voltage Vbias, namely to about a half of the power source voltage VDD. Therefore, only a voltage (about a half of the power source voltage VDD) equal to the potential difference between the power source VDD and signal lines 109, 110 is applied across the drain and source of the transistor 103 for amplification in the pixel 101. Here, voltage drop of the transistor 104 for vertical selection and transistor 111 for horizontal selection is neglected here for discussion.

Therefore, when the power source voltage VDD is set, for example, to 3.0 V, only a voltage of 1.5 V is applied across the drain and source of the transistor 103 for amplification. Accordingly, the transistor 103 for amplification operates under the condition that its mutual conductance gm is rather lower. As a result, signal voltage of the photo-diode 102 cannot be converted to a signal current with a sufficient amplification factor and as a result, sensitivity of image sensing device is lowered.

Moreover, even in the same related art, it has also been proposed that each potential of the vertical signal line 109 and horizontal signal line 110 is lowered so that a higher voltage is applied across the drain and source of the transistor 103 for amplification in the unit pixel 101 in order to improve the sensitivity. For this purpose, the bias voltage Vbias of the current/voltage converting circuit 113 is lowered and the part, in which the input/output characteristic is not so good, of the differential amplifier 114 is used.

Figure 4:
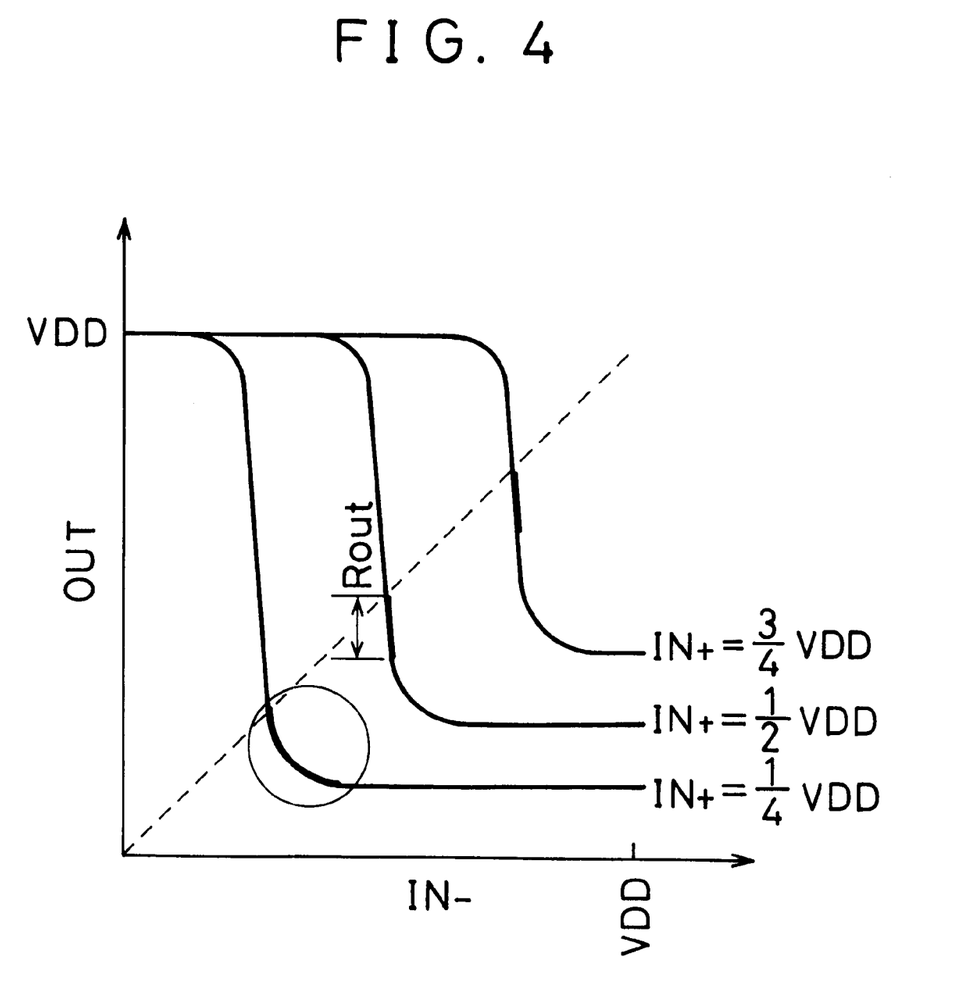
FIG. 4 is an input/output characteristic diagram of a differential amplifier forming the current/voltage converting circuit of the CMOS type image sensing device of the first embodiment.

Drop of the bias voltage Vbias of the current/voltage converting circuit 113 corresponds to change of IN+=½*VDD to IN+=¼*VDD in the input/output characteristic of the differential amplifier illustrated in FIG. 4. The dotted line of IN−=OUT written over the input/output characteristic indicates the operating point when the signal current is zero in the current/voltage converting circuit 113 and a thick solid line enclosed in the circle indicates the input/output characteristic (Rout) up to saturation from zero of the pixel signal current under the condition of IN+=¼*VDD.

Here, when attention is paid to the part of input/output characteristic enclosed by a circle, since the input/output characteristic is not indicated by a linear line, it can be understood that linearity is deteriorated and gain is low. Namely, this input/output characteristic indicates that as a result of compulsory adjustment of the bias voltage Vbias of the current/voltage converting circuit 113 in order to improve sensitivity of pixel, linearity and gain of the current/voltage converting circuit 113 are deteriorated.

SUMMARY OF THE INVENTION

The present invention is proposed considering the background explained above and it is therefore an object of the present invention to provide a solid state image sensing device which can improve amplification factor (sensitivity) of pixel while linearity of the current/voltage converting circuit is maintained and also provide a pixel signal processing method of the same.

In order to attain the object explained above, in the solid state image sensing device of the present invention in the structure that an image signal of each pixel is output to a signal line as the current and a signal current output to the signal line is converted to a signal voltage and it is then output, an input operation point of a current voltage converting means for converting a signal current to a signal voltage is set approximate to the ground level or power source level and a pixel signal can be derived by converting the signal current to the signal voltage with this current voltage converting means.

In a current output type solid state image sensing device, the potential of signal line can be lowered (or raised) by setting the input operation point of the current voltage converting means approximate to the ground level (or power source level). Thereby, a higher voltage can be applied to the transistor for amplification of the pixel. Sensitivity (amplification factor) of pixel can be raised by applying a higher voltage to the transistor for amplification.

Here, it is particularly preferable that the present invention is adapted to a CMOS type image sensing device where a current voltage circuit is formed on the same semiconductor substrate chip as the pixel part.

DETAILED DESCRIPTION OF THE PREFERRED EMBODIMENTS

Figure 1:
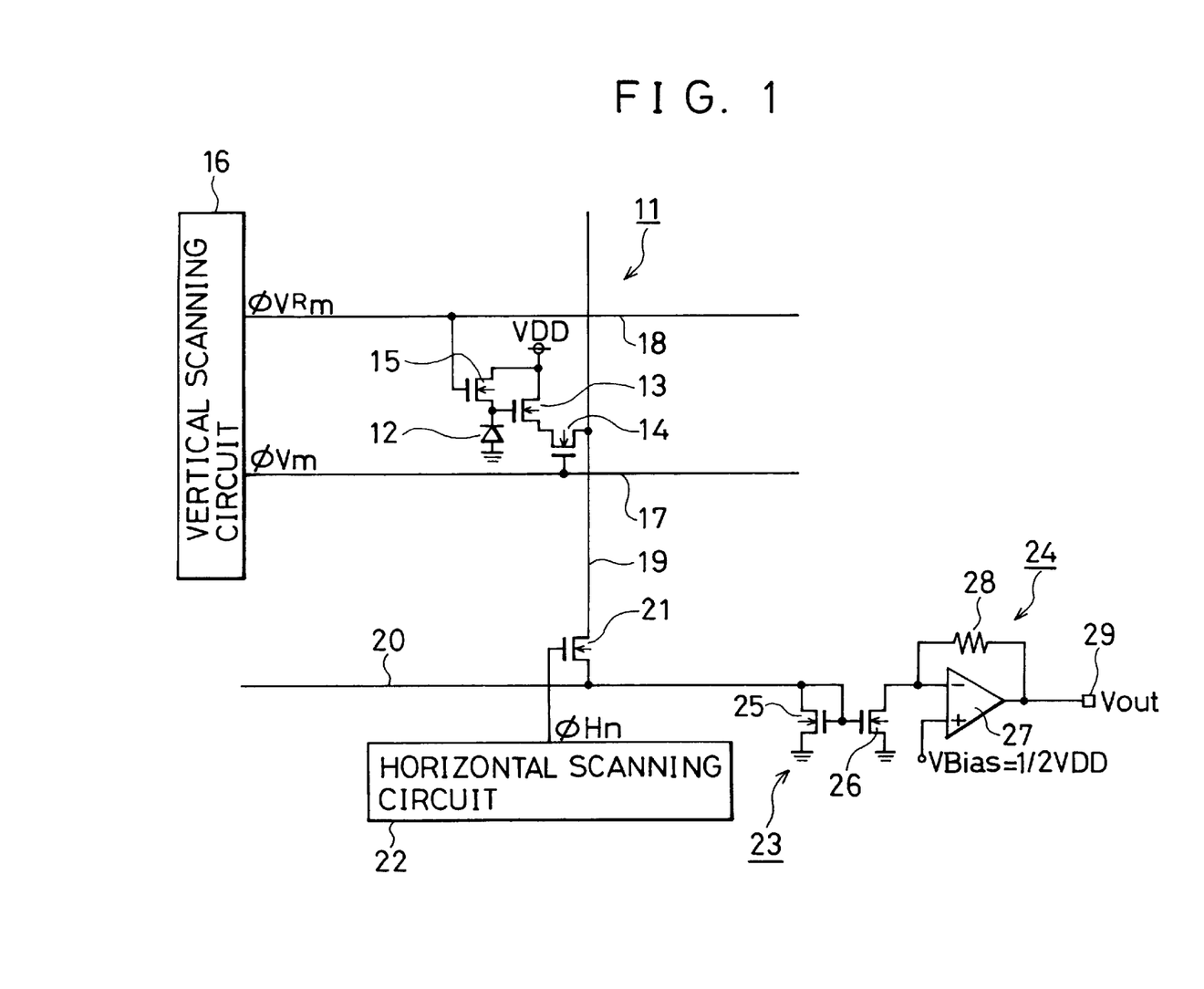
FIG. 1 illustrates a structure of CMOS type image sensing device of a current output system in relation to the first embodiment of the present invention.

The preferred embodiments of the present invention will be explained in detail with reference to the accompanying drawings. FIG. 1 illustrates a structure, for example, of the CMOS type image sensing device of the current output system as the first embodiment of the present invention.

In FIG. 1, the unit pixel 11 is formed of a photo-diode 12, a transistor 13 for amplification, a transistor 14 for vertical selection and a transistor 15 for reset. This unit pixel 11 is arranged in the X direction (column direction) and Y direction (row direction) to form the pixel part. Here, only the pixels of m rows and n columns are illustrated for simplifying the figure.

In this unit pixel 11, the vertical scanning pulses φ Vm is impressed to the gate electrode of a transistor 14 for vertical selection via the vertical selection line 17 from a vertical scanning circuit 16 and the vertical reset pulse φ $V^R$m is impressed to the gate electrode of a transistor 15 for reset via the vertical reset line 18 from a vertical scanning circuit 16. Moreover, signal charge photo-electrically converted by the photo-diode 12 is then converted to a signal current by the transistor 13 for amplification and is then output to the vertical signal line 19 through the transistor 14 for vertical selection.

A transistor 21 for horizontal selection is connected between the vertical signal line 19 and horizontal signal line 20. To the gate electrode of this transistor 21 for horizontal selection, the horizontal scanning pulse φ Hn is impressed from the horizontal scanning circuit 22. Therefore, the signal current output to the vertical signal line 19 from the pixel 11 flows into the horizontal signal line 20 via the transistor 21 for horizontal selection. To one terminal of the horizontal signal line 20, the current/voltage converting circuit 24 is connected via the current Miller circuit 23.

As explained above, the present invention is characterized in that the current Miller circuit 23 is provided between the horizontal signal line 20 and current/voltage converting circuit 24. The current Miller circuit 23 is composed of an N-channel MOS transistor 25 of which drain and gate are connected in common to the horizontal signal line 20 with the source connected to the ground and an N-channel MOS transistor 26 of which gate is connected in common to the MOS transistor 25 with the source connected to the ground. Here, both transistors 25 and 26 have the identical characteristics.

The current/voltage converting circuit 24 is composed of a differential amplifier 27 with an inverted (–) input terminal connected to the drain of the MOS transistor 26 of the current Miller circuit 23 and a feedback resistor 28 connected between the inverted input terminal and output terminal of the differential amplifier 27, and the bias voltage Vbias is applied to the non-inverted (+) input terminal of the differential amplifier 27. Thereby, a signal current input via the current Miller circuit 26 from the horizontal line 20 is converted to a signal voltage as the output signal.

Figure 2:
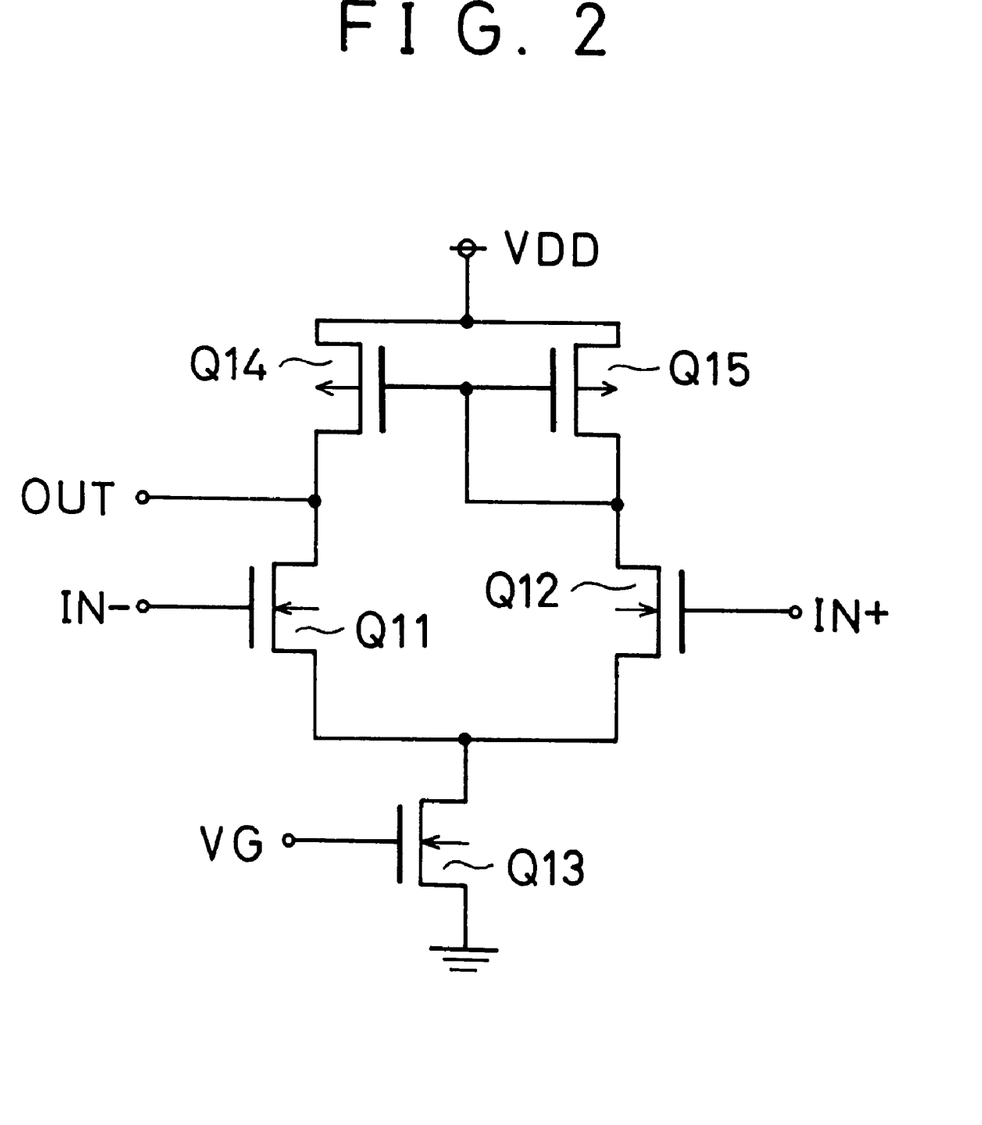
FIG. 2 is a circuit diagram illustrating a structure of a differential amplifier forming a current/voltage converting circuit of the CMOS type image sensing device of the first embodiment.

FIG. 2 illustrates an example of a practical circuit structure of the differential amplifier 27 in the current/voltage converting circuit 24. The differential amplifier 27 of this embodiment is composed of the differential pair transistors Q11, Q12 formed of the N-channel MOS transistor connected in common in its source, a current source transistor Q13 formed of the N-channel MOS transistor connected between the source common connecting point and the ground, and the P-channel MOS transistors Q14, Q15 connected between drains of the differential pair transistors Q11, 12 and the power source VDD to form the current Miller circuit.

In the differential amplifier 27 of the structure explained above, the inputs IN– and IN+ are given to each gate of the differential pair transistors Q11, Q12 and an output OUT can be derived from the drain of one transistor Q11. Moreover, a gate bias voltage VG is also impressed to the gate of the current source transistor Q13.

Next, the basic operation of the CMOS type image sensing device as the first embodiment of the present invention will be explained.

First, the photo-electrically converted signal charge (here, electron) is accumulated in a photo-diode 12. This accumulated signal charge is then output as a signal current after a voltage is amplified in the transistor 13 for amplification depending on the signal charge. This signal current is then output as a pixel signal to the vertical signal line 19 through the transistor 14 for vertical selection which is controlled by the vertical scanning pulse φ Vm output from the vertical scanning circuit 16.

The pixel signal output to the vertical signal line 19 is then output to the horizontal signal line 20 through the transistor 21 for horizontal selection which is controlled by the horizontal scanning pulse φ Hn output from the horizontal scanning circuit 22 in synchronization with the horizontal scanning. This pixel signal current is supplied to the current/voltage converting circuit 24 through the current Miller circuit 23 and is then output as the output voltage Vout from the output terminal 29 after conversion to the signal voltage in the current/voltage converting circuit 24.

The pixels which have once provided the outputs are then reset when the reset transistor 15 to be controlled by the vertical reset pulse φ $V^R$m output from the vertical scanning circuit 16 becomes conductive during the horizontal blanking period immediately after the output operation and thereafter newly start accumulation of signal charge.

Within a cycle of operation explained above, as its drive timing, the m-th pixel row is selected, during a certain horizontal scanning period, when the vertical scanning pulse φ Vm is impressed to the m-th vertical selection line 17 from the vertical scanning circuit 16 and the pixel signal of each pixel in this m-th row is output as a current to the vertical signal line 19 via the transistor 14 for amplification.

When the horizontal selection transistor 21 becomes conductive, during the horizontal image period, in response to the horizontal scanning pulse ( . . . , φ $H_{n-1}$, φ $H_n$, φ $H_{n+1}$, . . . ) sequentially output from the horizontal scanning circuit 20, each pixel signal current of m-th row is sequentially output to the horizontal signal line 20. This pixel signal current is then converted to a signal voltage by the current/voltage converting circuit 24 via the current Miller circuit 23 and is then output to an outside circuit of the image sensing device from the output terminal 29.

Figure 3:
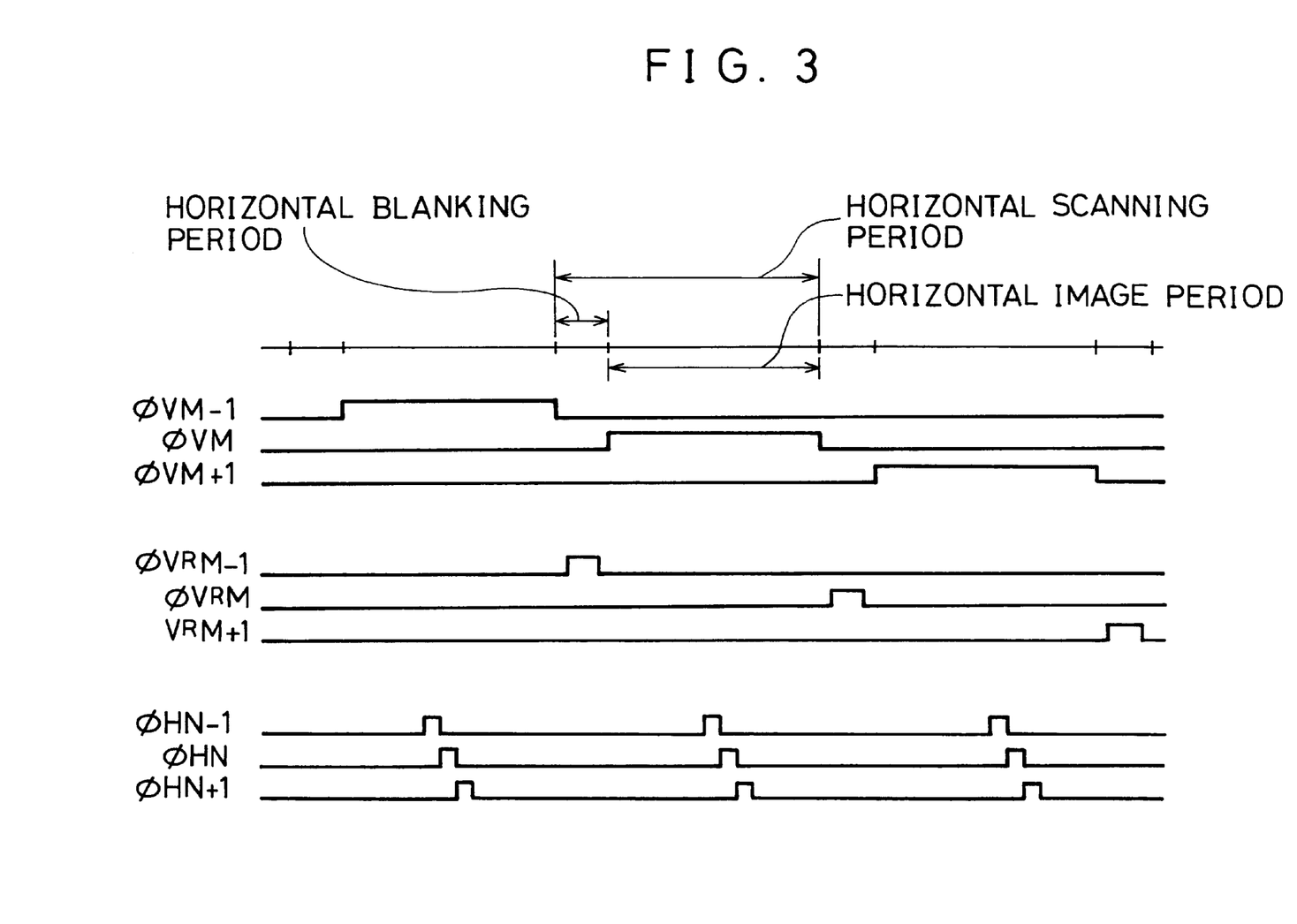
FIG. 3 is a timing chart for explaining operation of the CMOS type image sensing device of the first embodiment.

During the period where no signal is output, namely in the horizontal blanking period in the timing chart of FIG. 3, the vertical scanning pulse φ Vm falls, meanwhile the vertical reset pulse φ $V^R$m falls, the photo-diode 12 of each pixel of m-th row which has completed signal output is terminated to the power source via the reset transistor 15. Thereby the reset operation is conducted and new accumulation of image is started.

Here, the circuit operation of the current Miller circuit 23 which is a characteristic of the present invention will be explained. The current Miller circuit 23 performs the well known circuit operation in which an input current (drain current of transistor 25) becomes equal to an output current (drain current of transistor 26) without relation to an output voltage (drain voltage of transistor 26) when the MOS transistors 25, 26 respectively have the identical characteristic.

When the threshold voltage of the MOS transistor 25 is set so that an input voltage of current Miller circuit 23 (drain voltage of MOS transistor 25) becomes low within the range of pixel signal current entering the input side of the current Miller circuit 23, utilizing the property explained above, the input and output currents of the current Miller circuit 23 become identical even if an output voltage of the current Miller circuit 23 (drain voltage of transistor 26) is set to about ½ the power source voltage VDD which is higher than the voltage of input side.

Thereby, the current/voltage converting circuit 24 composed of the differential amplifier 27 and feedback resistor 28 can utilize good input/output characteristic of IN+= ½*VDD in the input/output characteristic of FIG. 4 on the occasion of converting a signal current to a signal voltage. In the input/output characteristic of FIG. 4, each line indicates the input/output characteristic wherein the bias voltage IN+ corresponding to the bias voltage Vbias of the current/voltage converting circuit 24 is changed as the parameter. As a result, a large voltage can be applied to the transistor 13 for amplification of the pixel 11 within the good linearity range of the current/voltage converting circuit 24.

In other words, a voltage difference can be given between the potential of horizontal signal line 20 and an input voltage of the current/voltage converting circuit 24 by inserting a current Miller circuit 23 between the horizontal signal line 20 and current/voltage converting circuit 24. As a result, it is now possible that the bias voltage of the differential amplifier 27 is set to provide the best input/output characteristic of the current/voltage converting circuit 24 and moreover each potential of the vertical signal line 19 and horizontal signal line 20 is reduced to give a large voltage across the drain and source of the transistor 13 for amplification in view of improving sensitivity of this image sensing device.

Namely, since a current Miller circuit 23 is provided between the horizontal signal line 20 and current/voltage converting circuit 24, each potential of the vertical signal line 19 and horizontal signal line 20 and input voltage of the current/voltage converting circuit 24 can be controlled independently. As a result, the input operation point of the current/voltage converting circuit 24 can be set approximate to the ground level, thereby resulting in improvement of sensitivity (amplification factor) of the pixel 11 and maintaining of linearly of the current/voltage converting circuit 24.

As a practical method for setting the threshold voltage of the MOS transistor 25, the threshold voltage of the MOS transistors 25, 26 is set so that the required drain-source voltage is impressed to the MOS transistor 25 but if this threshold voltage is about 0.5V, for example, each potential of the vertical signal line 19 and horizontal signal line 20 becomes a little higher than the threshold voltage of 0.5V. As a result, such potential becomes equal to the potential of the signal line which is sufficient for normal operation of the current Miller circuit 23 formed of the MOS transistors 25, 26.

In this embodiment, an example is explained, in which the N-channel MOS transistor is used as the pixel transistors 13 to 15 but it is only natural that the P-channel MOS transistor can also be used. In this case, it is enough to use the P-channel MOS transistor as a couple of transistors forming the current Miller circuit 23. Thereby, the input operation point of the current/voltage converting circuit 24 can be set approximate to the power source (VDD) level. As a result, a large voltage can be applied to the transistor for amplification of the pixel.

Figure 5:
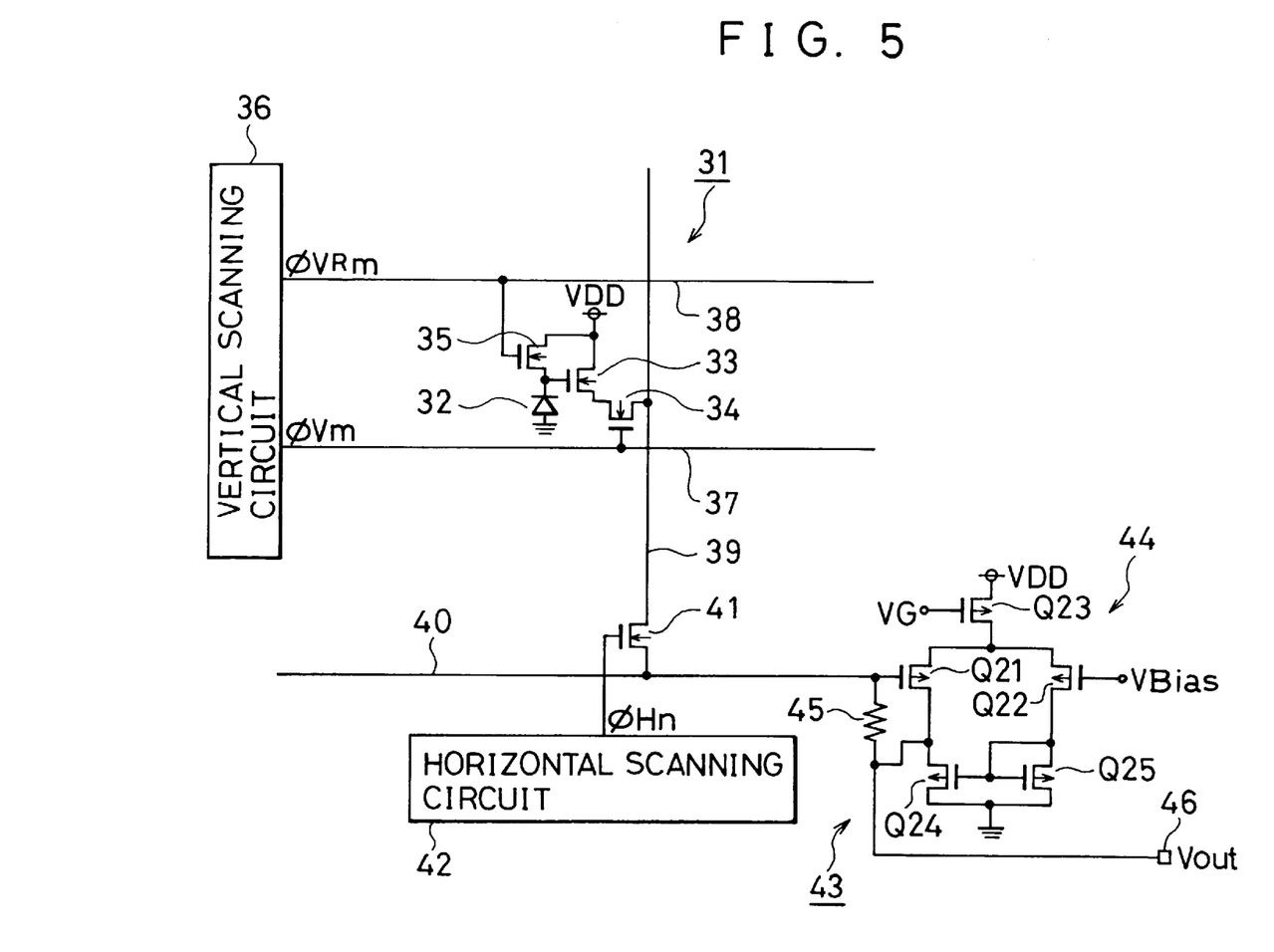
FIG. 5 illustrates a structure of the CMOS type image sensing device of the current output system of the second embodiment of the present invention.

FIG. 5 illustrates a structure of the CMOS type image sensing device, for example, of the current output system as the second embodiment of the present invention.

In FIG. 5, the unit pixel 31 is formed of a photo-diode 32, a transistor 33 for amplification and a transistor 35 for reset. As these pixel transistors 33 to 35, the N-channel MOS transistor is used in this embodiment. This unit pixel 31 is arranged in both X direction and Y direction to form the pixel part. Here, only the pixels of m rows and n columns are illustrated for simplifying the figure.

In this unit pixel 31, the vertical scanning pulse φ Vm is given to the gate electrode of vertical selection transistor 34 via the vertical selection line 37 from the vertical scanning circuit 36, while the vertical reset pulse φ V$^R$m is given to the gate electrode of reset transistor 35 via the vertical reset line 38 from the vertical scanning circuit 36. Moreover, the signal charge photo-electrically converted by the photodiode 32 is then converted to a signal current by the transistor 33 for amplification and is then output to the vertical signal line 39 through the vertical selection transistor 34.

Between the vertical signal line 39 and horizontal signal line 40, the horizontal selection transistor 41 is connected. To the gate electrode of the horizontal selection transistor 41, the horizontal pulse φ Hn is impressed from the horizontal scanning circuit 42. Thereby, the signal current output to the vertical signal line 39 from the pixel 31 flows into the horizontal signal line 40 through the horizontal selection transistor 41.

To one terminal of the horizontal signal line 40, the current/voltage converting circuit 43 is provided. This current/voltage converting circuit 43 is formed of the differential amplifier 44 and feedback resistor 45 and converts the pixel signal current which is input through the horizontal signal line 40 to the signal voltage and then outputs this signal voltage as the output voltage Vout to an external circuit through the output terminal 46.

Figure 6:
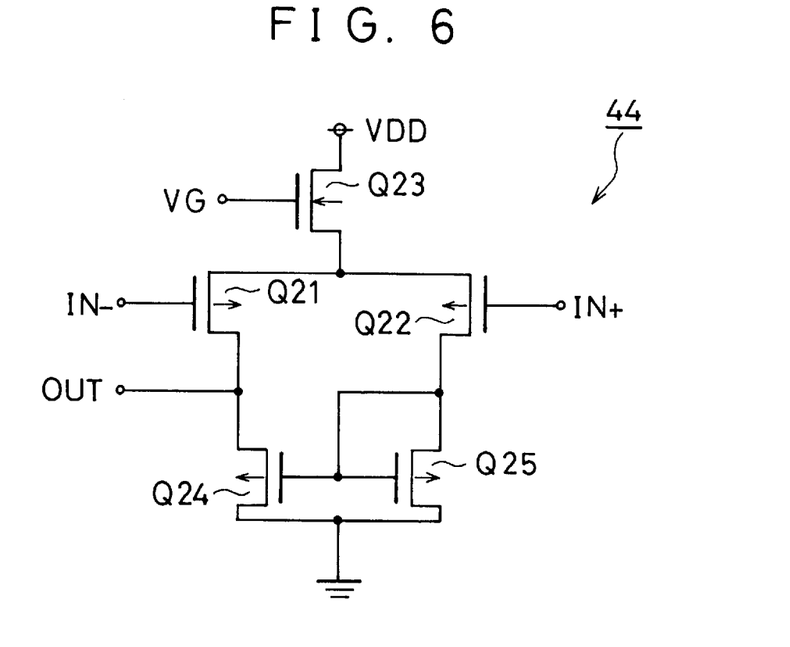
FIG. 6 is a circuit diagram illustrating an example of the structure of differential amplifier forming the current/voltage converting circuit of the CMOS type image sensing device of the second embodiment.

As is apparent from FIG. 6, the differential amplifier 44 is composed of the differential pair transistors Q21, Q22 consisting of the P-channel MOS transistor with the source connected in common, the current source transistor Q23 consisting of the P-channel MOS transistor connected between the source common connecting point and the power source VDD and the N-channel MOS transistors Q24, Q25 connected between the drains of the differential pair transistors Q21, Q22 and the ground to form the current Miller circuit.

In the differential amplifier 44 in the structure explained above, the gate of one transistor Q21 of the differential pair transistors is connected to the horizontal signal line 40 and the bias voltage Vbias is impressed to the other transistor Q22 of the differential pair transistors. Thereby, an output voltage Vout can be derived from the drain of the differential pair transistor Q21. To the gate of current source transistor Q23, the gate bias voltage VG is impressed. Moreover, the feedback resistor 45 is connected between the gate of the differential pair transistor Q21 (non-inverted input terminal of the differential amplifier 44) and the drain thereof (output terminal of the differential amplifier 44).

The CMOS type image sensing device as the second embodiment of the structure explained above is characterized in that the N-channel MOS transistor is used as the amplification transistor 33 of the pixel 31, while the P-channel MOS transistor is used, in place of the N-channel MOS transistor, as the differential pair transistors Q21, Q22 in the differential amplifier 44 of the current/voltage converting circuit 43.

In case the N-channel MOS transistor is used as the amplification transistor 33 of pixel 31, when the potential of signal line (vertical signal line 39 and horizontal signal line 40) is lowered, a large voltage is applied to the amplification transistor 33. In this case, it is more preferable to introduce the differential amplifier, namely a circuit configuration using the P-channel MOS transistor as the differential pair amplifiers Q21, Q22, in which the output voltage Rout is in the lower voltage range, as illustrated in the input/output characteristic of FIG. 7, in comparison with the input/output characteristic (input/output characteristic of FIG. 4) of the differential amplifier (refer to FIG. 2) using the N-channel MOS transistor as the differential pair transistors Q21, Q22.

In the CMOS type image sensing device of this embodiment, the bias voltage Vbias of the current/voltage converting circuit 43 must be lowered in order to lower the potential of the signal line (vertical signal line 39 and horizontal signal line 40) to apply a large voltage to the amplification transistor 33 of the pixel 31. When the bias voltage Vbias is lowered, the input/output characteristic curve (refer to FIG. 7) in the differential amplifier 44 of FIG. 6 changes toward IN+=¼*VDD from IN+=½*VDD.

Figure 7:
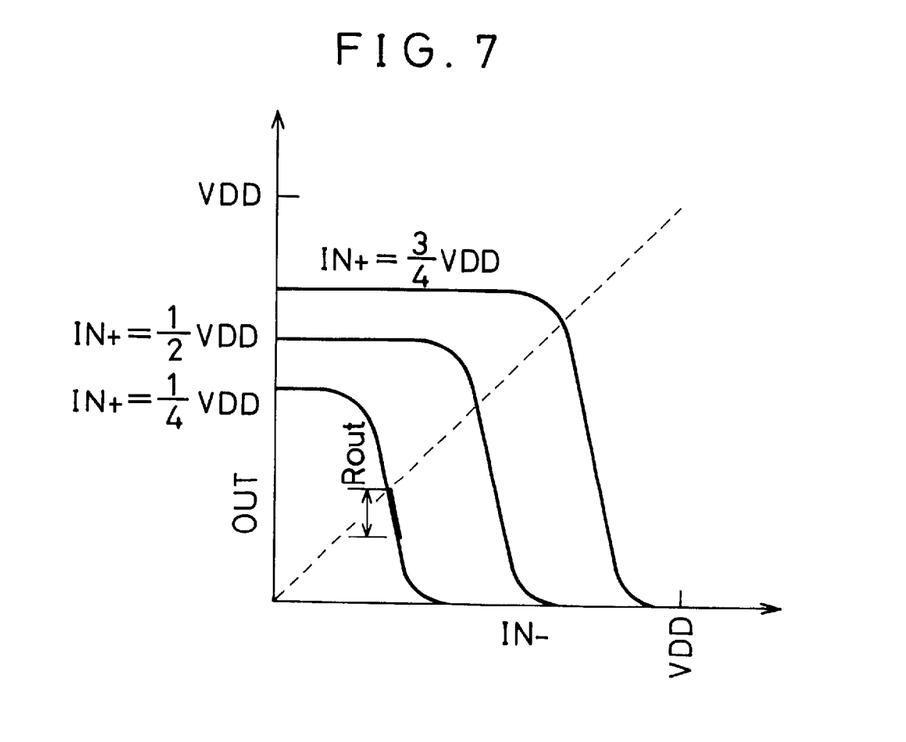
FIG. 7 an input/output characteristic of the differential amplifier forming the current/voltage converting circuit of the CMOS type image sensing device of the second embodiment.

In regard to the input/output characteristic of the condition of IN+=¼*VDD, the input/output characteristic (Rout) in which the pixel signal current indicated by a thick solid line changes from 0 to saturated condition shows excellent linearity and thereby the output voltage range (Rout) of the current/voltage converting circuit 43 can also be attained.

Namely, in the CMOS type image sensing device of the current output system of the structure utilizing N-channel MOS transistor as the pixel transistors 35 to 35, the input operation point of the current/voltage converting circuit 43 can be set approximate to the ground level by forming the differential amplifier 44 with the differential pair transistors Q21, Q22 of the P-channel MOS transistor. Thereby, each potential of the signal lines 39, 40 can be lowered. As a result, it becomes possible that a large voltage can be applied to the amplification transistor 33 of the pixel 31 and good linearity range of the current/voltage converting circuit 43 can be utilized.

In this second embodiment, the present invention has been adapted to the CMOS type image sensing device using the N-channel MOS transistor as the pixel transistors 35 to 35 but the present invention can also be adapted to the CMOS type image sensing device using the P-channel MOS transistor. In this case, it is enough to use the N-channel MOS transistor as the differential pair transistors Q21, Q22. Thereby, the input operation point of the current/voltage converting circuit 43 can be set approximate to the power source (VDD) level. As a result, a large voltage can be impressed to the amplification transistor of pixel.

Moreover, in each embodiment, the present invention is applied to the CMOS type image sensing device, but the present invention is not restricted thereto and the present invention can widely be applied to the X-Y address type solid state image sensing device of the other current output system such as an amplification type image sensing device.

In addition, in above embodiments, the current/voltage converting circuit can be fabricated on the same semiconductor substrate together with the pixel part.

As explained above, according to the present invention, in the solid state image sensing device of the structure in which a pixel signal from each pixel is output as the current, a larger voltage can be impressed by the amplification transistor of pixel because the input operation point of the current voltage converting means for converting the signal current to the signal voltage is set approximate to the power source level. Therefore, the amplification factor (sensitivity) of pixel can be improved, while the linearity of current voltage converting means is maintained.

What is claimed is:

1. A solid state image sensing device, comprising:
   a pixel part in which pixels are arranged in the shape of a matrix to output a pixel signal of each pixel as a current to the signal line;
   current/voltage converting means for outputting a signal voltage by converting a signal current output to said signal line from each pixel of said pixel part; and operation point setting means for setting the input operation point of said current voltage converting means approximate to the ground level or power source level.

2. A solid state image sensing device as claimed in claim 1, wherein said operation point setting means is formed of a current Miller circuit that is provided between said signal line and the input of said current voltage converting means.

3. A solid state image sensing device as claimed in claim 2, wherein a MOS transistor in the same polarity as the amplification transistor in each pixel of said pixel part is used as the transistor forming said current Miller circuit.

4. A solid state image sensing device, comprising:

a pixel part in which pixels are arranged in the shape of a matrix and a pixel signal of each pixel is output to a signal line as a current; and current/voltage converting means that is formed using a differential amplifier to output a signal voltage by converting a signal current, which is output to said signal line from each pixel of said pixel part, to the signal voltage; wherein a MOS transistor of inverse polarity to the amplification transistor in each pixel of said pixel part is used as differential pair transistors used for said differential amplifier.

5. A pixel signal processing method in the solid state image sensing device of the structure in which pixels are arranged in the shape of matrix, the pixel signal of each pixel is output as a current to the signal line and the signal current output to this signal line is output through conversion to the signal voltage, said method comprising the steps of:

setting the input operation point of a current/voltage converting means for converting a signal current to a signal voltage approximate to the ground level or power source level; and deriving a pixel signal by converting a signal current to a signal voltage with said current/voltage converting means.

6. A solid state image sensing device as claimed in claim 1, wherein said current/voltage converting means is formed on the same semiconductor substrate together with said pixel part.

7. A solid state image sensing device as claimed in claim 4, wherein said current/voltage converting means is formed on the same semiconductor substrate together with said pixel part.

* * * * *

UNITED STATES PATENT AND TRADEMARK OFFICE
CERTIFICATE OF CORRECTION

PATENT NO. : 6,339,215
DATED : January 15, 2002
INVENTOR(S) : Kazuya Yonemoto et al.

It is certified that error appears in the above-identified patent and that said Letters Patent is hereby corrected as shown below:

<u>Title page,</u>
ABSTRACT should read:
-- A bias voltage must be reduced to about a half of the power source voltage in order to reserve sufficient output voltage range of a current/voltage converting circuit but, as a result, about a half voltage of the power source voltage is applied to the amplification transistor of a pixel and, thereby, the amplification factor of the pixel is lowered and linearity is deteriorated. Therefore, each potential of the signal lines is lowered, and a larger voltage is applied to the amplification transistor of the pixel by providing a current Miller circuit between the horizontal signal line and the current/voltage converting circuit and by controlling independently each potential of the vertical signal line and the horizontal signal line and the input voltage of the current/voltage converting circuit in the CMOS-type image sensing device of the current output system in which the pixel signal is output to the vertical signal line as the signal current from each pixel. --

Signed and Sealed this

Twenty-first Day of May, 2002

*Attest:*

*Attesting Officer*

JAMES E. ROGAN
*Director of the United States Patent and Trademark Office*